(12) United States Patent
Lee et al.

(10) Patent No.: US 7,501,146 B2
(45) Date of Patent: Mar. 10, 2009

(54) CARBON NANOTUBE EMITTER AND ITS FABRICATION METHOD AND FIELD EMISSION DEVICE (FED) USING THE CARBON NANOTUBE EMITTER AND ITS FABRICATION METHOD

(75) Inventors: Hang-Woo Lee, Suwon-si (KR); Yong-Wan Jin, Seoul (KR); In-Taek Han, Seoul (KR); Ha-Jin Kim, Suwon-si (KR); Min-Jong Bae, Anyang-si (KR)

(73) Assignee: Samsung SDI Co., Ltd., Suwon-si, Gyeonggi-do Jorea ( * ) Notice: Subject to any disclaimer, the term of this patent is extended or adjusted under 35 U.S.C. 154(b) by 596 days.

(21) Appl. No.: 11/244,106

(22) Filed: Oct. 6, 2005

(65) Prior Publication Data
US 2006/0192475 A1 Aug. 31, 2006

(30) Foreign Application Priority Data
Oct. 12, 2004 (KR) .................. 10-2004-0081344

(51) Int. Cl.
B05D 5/00 (2006.01)
B05D 5/12 (2006.01)
H01J 9/00 (2006.01)
(52) U.S. Cl. .................. 427/77; 427/58; 427/123; 427/126.6; 313/310; 977/840; 977/842; 977/847; 977/890

(58) Field of Classification Search .................. 427/77, 427/78, 123, 58, 111, 112, 126.6; 313/310, 313/309; 977/840, 847, 890
See application file for complete search history.

(56) References Cited

U.S. PATENT DOCUMENTS

| 6,325,909 | B1 | 12/2001 | Li et al. |
| 6,914,372 | B1 * | 7/2005 | Akiyama et al. ............. 313/309 |
| 7,144,563 | B2 * | 12/2006 | Rao et al. ................. 423/447.3 |
| 2002/0036452 | A1 * | 3/2002 | Muroyama et al. .......... 313/310 |
| 2005/0046322 | A1 * | 3/2005 | Kim et al. .................... 313/309 |

OTHER PUBLICATIONS

Chinese Office Action dated Jul. 18, 2008 in corresponding Chinese Patent Application No. 2005101132051.

* cited by examiner

*Primary Examiner*—Michael Kornakov
*Assistant Examiner*—Francis P Smith
(74) *Attorney, Agent, or Firm*—Robert E. Bushnell, Esq.

(57) ABSTRACT

A carbon nanotube emitter and its fabrication method, a Field Emission Device (FED) using the carbon nanotube emitter and its fabrication method include a carbon nanotube emitter having a plurality of first carbon nanotubes arranged on a substrate and in parallel with the substrate, and a plurality of the second carbon nanotubes arranged on a surface of the first carbon nanotubes.

19 Claims, 9 Drawing Sheets

CARBON NANOTUBE EMITTER AND ITS FABRICATION METHOD AND FIELD EMISSION DEVICE (FED) USING THE CARBON NANOTUBE EMITTER AND ITS FABRICATION METHOD

CLAIM OF PRIORITY

This application makes reference to, incorporates the same herein, and claims all benefits accruing under 35 U.S.C. §119 from an application for CARBON NANOTUBE EMITTER AND FABRICATING METHOD THEREFOR, AND FIELD EMISSION DEVICE USING THE SAME AND FABRICATING METHOD THEREFOR, earlier filed in the Korean Intellectual Property Office on 12 Oct. 2004 and there duly assigned Serial No. 10-2004-0081344.

BACKGROUND OF THE INVENTION

1. Field of the Invention

The present invention relates to a carbon nanotube emitter and its fabrication method, and a Field Emission Device (FED) using the carbon nanotube emitter and its fabrication method.

2. Description of the Related Art

Once unique structural and electrical properties of carbon nanotubes were known, research has been performed for applying the carbon nanotubes to devices, such as Field Emission Devices (FEDs), transistors, and secondary batteries. In particular, the carbon nanotube used as an emitter of an FED has many advantages including low driving voltage, high luminance, high cost efficiency, and the like. Examples of methods of fabricating carbon nanotube emitters include screen printing that uses a carbon nanotube powder, and a method that uses Chemical Vapor Deposition (CVD). The carbon nanotube growth method that uses CVD has advantages that it make it possible to fabricate a high-resolution display device and has a simple process because it directly grows carbon nanotubes on a substrate. Thus, research in carbon nanotube growth is actively progressing. Representative examples of Chemical Vapor Deposition include Plasma Enhanced Chemical Vapor Deposition (PECVD) and thermal Chemical Vapor Deposition (CVD).

To fabricate improved FEDs, the carbon nanotubes used as the emitter should have a lower driving voltage and higher electron emission current and exhibit a uniform electron emission property over a wide area. To have a lower driving voltage and higher electron emission current, the carbon nanotubes should have a thinner diameter and a proper density. Since the diameter of the carbon nanotubes is determined by a size of a catalyst metal on the tube, it is necessary to form and control catalyst particles having a smaller size in order to synthesize carbon nanotubes having the thin diameter. Furthermore, in order to adjust the density of the carbon nanotubes, it is necessary for the grown carbon nanotubes to be unidirectional. To obtain a uniform electron emission property over the wide area, it is necessary for a growth system to provide a uniform temperature distribution.

SUMMARY OF THE INVENTION

The present invention provides a carbon nanotube emitter with low driving voltage and high electron emission current that exhibits uniform electron emission, its fabrication method and a Field Emission Device (FRD) using the carbon nanotube emitter and its fabrication method.

According to one aspect of the present invention, a carbon nanotube emitter is provided including: a plurality of first carbon nanotubes fixed on a substrate in parallel with the substrate; and a plurality of the second carbon nanotubes formed on a surface of the first carbon nanotubes.

A plurality of nano catalyst particles can be present on the surface of the first carbon nanotubes, and the second carbon nanotubes can be grown and formed from the nano catalyst particles.

The nano catalyst particles can be formed of either a nickel (Ni) or an Invar alloy.

Preferably, the first carbon nanotubes have a diameter of 30 to 100 nm, and the second carbon nanotubes have a diameter of 1 to 10 nm.

According to another aspect of the present invention, a method of fabricating a carbon nanotube emitter is provided, the method including: growing a plurality of first carbon nanotubes on a first substrate having a catalyst material layer formed thereon; separating the first carbon nanotubes from the first substrate and immersing the first separated carbon nanotubes in a dispersion solution; coating a second substrate with the dispersion solution and baking the second coated substrate at a predetermined temperature to arrange the first carbon nanotubes on the second substrate and in parallel with the second substrate; and growing a plurality of second carbon nanotubes from a plurality of nano catalyst particles on the surface of the first carbon nanotubes.

The catalyst material layer can be formed of a nickel (Ni) or an Invar alloy.

Preferably, the first carbon nanotubes are vertically grown on the first substrate by Plasma Enhanced Chemical Vapor Deposition (PECVD).

The first carbon nanotubes can be separated from the first substrate by an ultrasonic wave, and the dispersion solution can be either IsoPropyl Alcohol (IPA) or DEionized (DE) water. The dispersion solution can contain a charging agent.

The dispersion solution can be coated by either electrophoresis or spin coating, and the coated dispersion solution can be baked at a temperature of 70 to 100° C.

Preferably, the second carbon nanotubes are grown by thermal Chemical Vapor Deposition (CVD).

According to yet another aspect of the present invention, a Field Emission Device (FED) is provided including: a substrate; a cathode electrode formed on the substrate; an insulating layer formed over the substrate to cover the cathode electrode and having an emitter hole to expose part of the cathode electrode; a gate electrode formed on the insulating layer; and a carbon nanotube emitter formed on the cathode electrode that is exposed via the emitter hole, wherein the carbon nanotube emitter includes a plurality of first carbon nanotubes fixed on the cathode electrode in parallel with the cathode electrode, and a plurality of second carbon nanotubes formed on a surface of the first carbon nanotubes.

According to yet another aspect of the present invention, a method of fabricating a Field Emission Device (FED) is provided, the method including: growing a plurality of first carbon nanotubes on a first substrate having a catalyst material layer formed thereon; separating the first carbon nanotubes from the first substrate and immersing the first separated carbon nanotubes into a dispersion solution; sequentially forming a cathode electrode, an insulating layer, and a gate electrode on the second substrate and forming an emitter hole to expose part of the cathode electrode; coating a top surface of the gate electrode and an inner wall of the emitter hole with photoresist to cover them and patterning the photoresist to expose the cathode electrode beneath the emitter hole; coating the photoresist and the exposed cathode electrode with the dispersion solution and baking them at a predetermined temperature; removing the photoresist to leave the first carbon nanotubes on the exposed cathode electrode; and growing a plurality of second carbon nanotubes from a plurality of nano catalyst particles on the surface of the first carbon nanotubes.

According to yet another aspect of the present invention, a display device is provided including: lower and upper substrates disposed to be spaced apart from each other; a cathode electrode formed on the lower substrate; an insulating layer formed over the lower substrate to cover the cathode electrode, the insulating layer having an emitter hole to expose part of the cathode electrode; a gate electrode formed on the insulating layer; a carbon nanotube emitter formed on the cathode electrode exposed via the emitter hole, the carbon nanotube emitter including a plurality of first carbon nanotubes fixed on the cathode electrode and in parallel with the cathode electrode, and a plurality of second carbon nanotubes formed on a surface of the first carbon nanotubes; an anode electrode formed on a bottom surface of the upper substrate; and a phosphor layer formed on a bottom surface of the anode electrode.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1A:
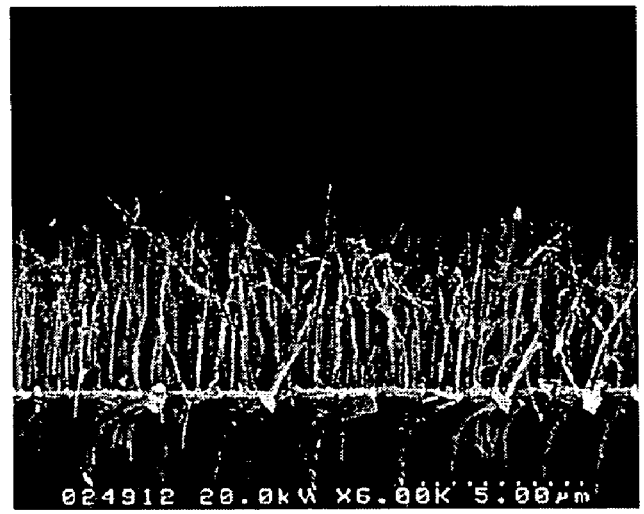
FIGS. 1A and 1B are Scanning Electron Microscopy (SEM) images of carbon nanotubes that are grown on a substrate by Plasma Enhanced Chemical Vapor Deposition (PECVD)

The present invention is described more fully hereinafter with reference to the accompanying drawings, in which exemplary embodiments of the present invention are shown. This invention can, however, be embodied in many different forms and should not be construed as being limited to the embodiments set forth herein. Rather, these embodiments are provided so that this disclosure will be thorough and complete, and will fully convey the scope of the present invention to those skilled in the art. In the drawings, the thicknesses of layers and regions have been exaggerated for clarity. Like numbers refer to like elements throughout the specification.

The growth of carbon nanotubes using Plasma Enhanced Chemical Vapor Deposition (PECVD) and Chemical Vapor Deposition (CVD) are discussed first below.

Figure 1B:
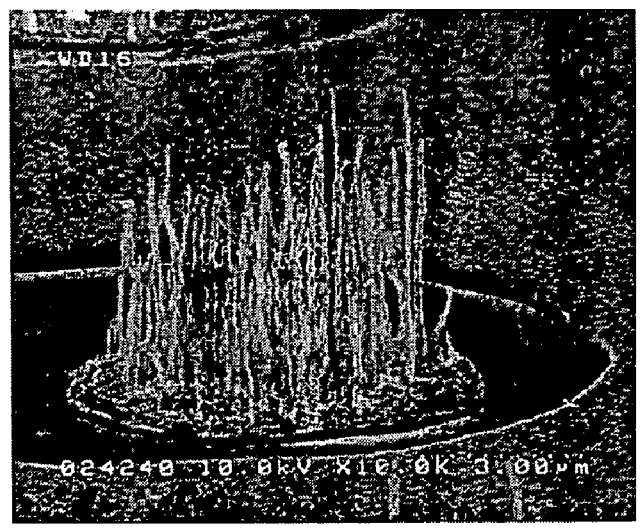

FIGS. 1A and 1B are Scanning Electron Microscopy (SEM) images of carbon nanotubes that are grown on a substrate by Plasma Enhanced Chemical Vapor Deposition (PECVD).

FIG. 1A shows carbon nanotubes that are grown for 30 minutes on an unpatterned catalyst metal layer that is formed on a glass substrate. The carbon nanotubes as shown in FIG. 1A were vertically grown on the substrate, with the length of carbon nanotubes being about 5 µm and the diameter being about 50 to 80 nm. FIG. 1B shows carbon nanotubes which have been grown for 20 minutes by the PECVD on the catalyst metal layer, wherein the catalyst metal layer has been patterned into a disk shape having a diameter of 10 µm by a photolithography process. Referring to FIG. 1B, it can be seen that the carbon nanotubes were selectively grown on the circular catalyst metal layer pattern. The grown carbon nanotubes exhibited a length and diameter distribution in which the length is about 3 µm and the diameter is about 50 to 80 nm.

The carbon nanotube growth method with the PECVD has advantages in that it is possible to vertically grow the carbon nanotubes on the substrate and it is possible to synthesize the carbon nanotubes at a relatively lower temperature compared to other growth methods. The vertical growth of the carbon nanotubes depends on the direction of an electric field applied between an anode electrode and a cathode electrode in a PECVD system. This allows the growth direction of the carbon nanotubes to be adjusted depending on the direction of the electric field. Furthermore, the method has an advantage in that it is easy to adjust the density and to emit electrons by means of the electric field because the growth direction of the carbon nanotubes is uniform. However, the method has disadvantages in that it is difficult to grow uniform carbon nanotubes, and the carbon nanotubes grown at a low temperature have a bad electric field emission property because of their relatively large diameter.

Figure 2A:
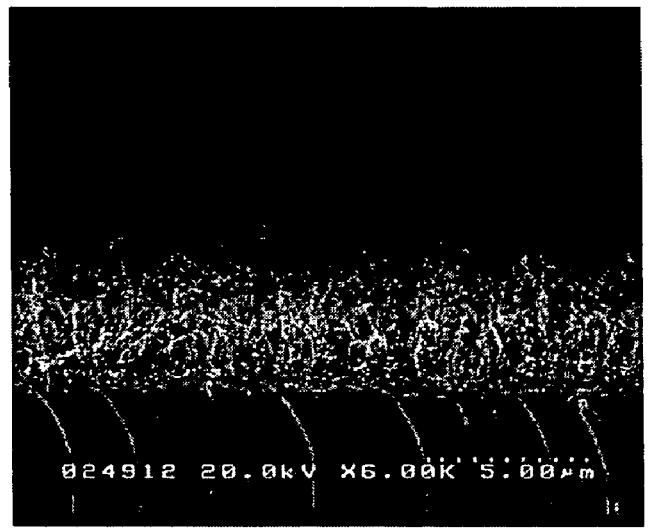
FIGS. 2A and 2B are SEM images of carbon nanotubes that are grown on a substrate by thermal Chemical Vapor Deposition (CVD)
Figure 2B:
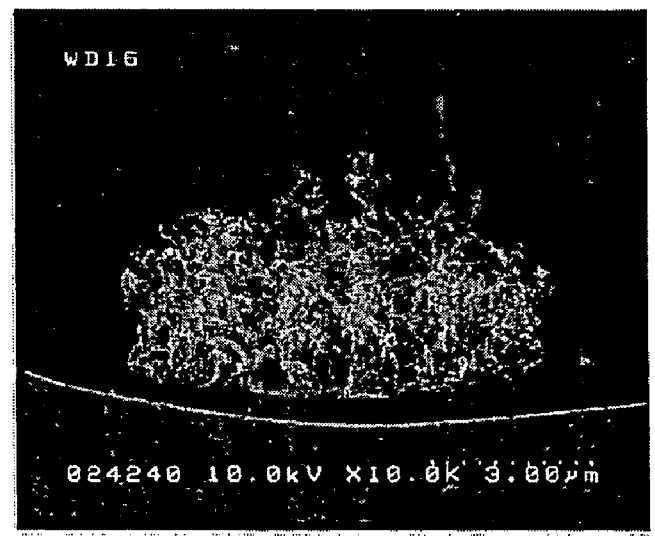

FIGS. 2A and 2B are SEM images of carbon nanotubes that are grown on a substrate by thermal Chemical Vapor Deposition (CVD).

The carbon nanotubes on a flat panel substrate (FIG. 2A) and a patterned substrate (FIG. 2B) were grown in a random direction. The carbon nanotubes are shown to be tangled with one another. The grown carbon nanotubes have a diameter of about 40 to 50 nm, which is thinner than that of the carbon nanotubes grown by the PECVD, and have a growth length of about 4 µm.

This thermal CVD has advantages in that growth uniformity of the carbon nanotubes is excellent by virtue of the constant temperature of an entire sample, and it is possible to form carbon nanotubes with low electron emission initiation voltage (i.e., turn-on voltage) because carbon nanotubes can be grown with a thinner diameter as compared to the PECVD. However, thermal CVD has a disadvantage in that the growth direction of the carbon nanotubes is not constant because an electric field is not applied to the substrate upon growing the carbon nanotubes unlike the PECVD, and it needs high growth temperature as compared to others growth method because thermal energy is used for gas dissolution.

FIGS. 3A through 3D are views of a method of fabricating a carbon nanotube emitter according to an embodiment of the present invention.

Figure 3A:
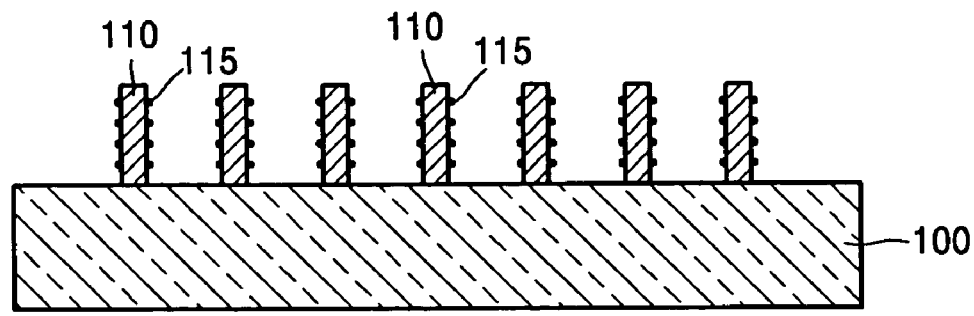
FIGS. 3A through 3D are views of a method of fabricating a carbon nanotube emitter according to an embodiment of the present invention.

Referring to FIG. 3A, a catalyst material layer (not shown) is deposited on a first substrate 100, and a plurality of the first carbon nanotubes 110 are vertically grown on the catalyst material layer by PECVD. The first grown carbon nanotubes 110 have a diameter of approximately 30 to 100 nm. A glass substrate or a silicon wafer can be used as the first substrate 100. The catalyst material layer for the growth of the first carbon nanotubes 110 can be Ni or an Invar alloy. The Invar alloy has a composition of Fe 52 mol %, Ni 42 mol % and Co 6 mol %.

Figure 4:
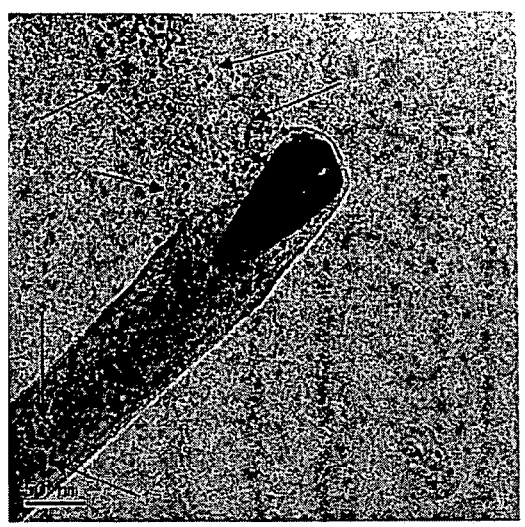
FIG. 4 is a Transmission Electron Microscopy (TEM) image of nano catalyst particles that are present in sides of first carbon nanotubes that are grown by Plasma Enhanced Chemical Vapor Deposition (PECVD)
Figure 5A:
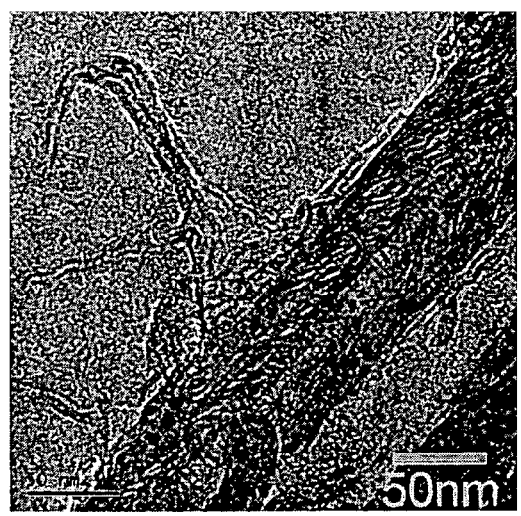
FIGS. 5A through 5D are TEM images of second carbon nanotubes that are grown according to a method of the an embodiment of the present invention.
Figure 5B:
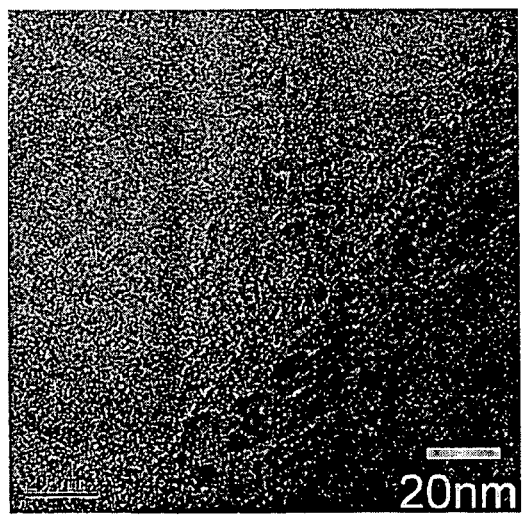
Figure 5C:
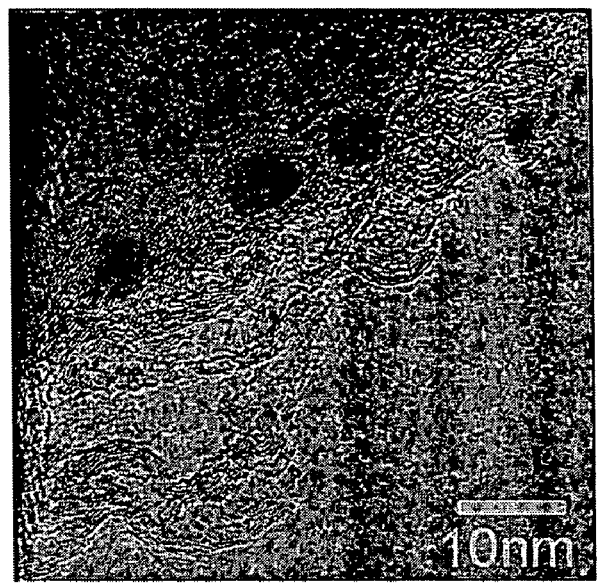
Figure 5D:
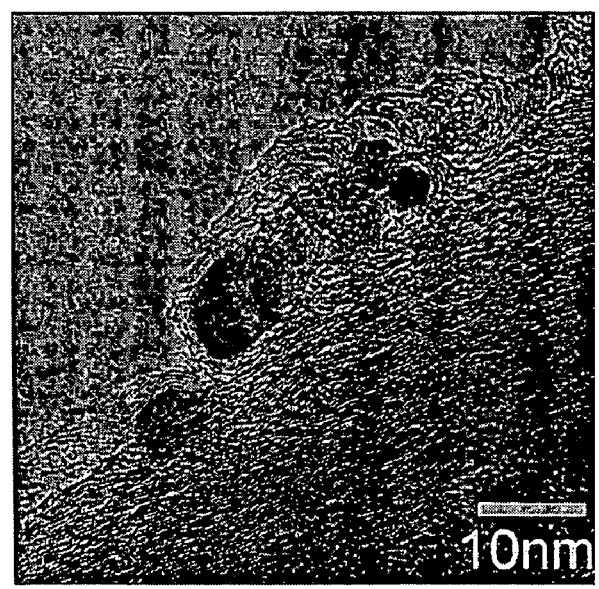

The catalyst material layer, which is used in the growth of the first carbon nanotubes 110, is finely broken by strain between a carbon layer of the first carbon nanotubes 110 and the catalyst material layer, and is fixed on a surface of the first grown carbon nanotubes 110 in the form of particles. Thus, the plurality of nano catalyst particles 115 are not coagulated but are present uniformly on the surface of the first carbon nanotubes 110, which have been grown by the PECVD used in the present invention. In this case, the nano catalyst particles 115 have a size of approximately 1 to 10 nm. FIG. 4 is a Transmission Electron Microscopy (TEM) image showing that the nano catalyst particles (as indicated by arrows) are present on the surface of first carbon nanotubes, which are grown by PECVD.

Figure 3B:
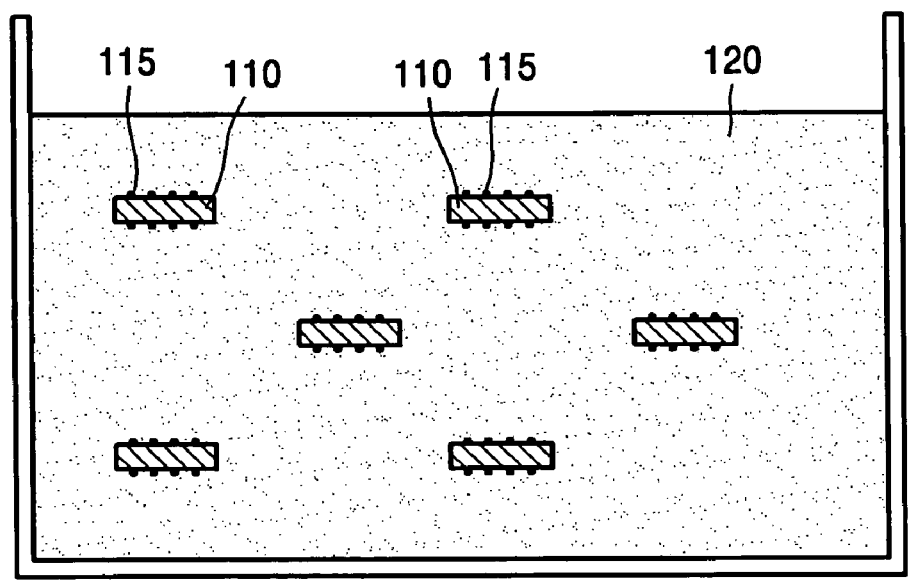

Referring to FIG. 3B, the first carbon nanotubes 110 are separated from the first substrate 100 and are immersed in a dispersion solution 120 to be uniformly dispersed. In this case, an ultrasonic wave can be used to separate the first carbon nanotubes 110. IsoPropyl Alcohol (IPA) or DeIonized water (DI water) can be used as the dispersion solution 120. A charging agent, such as $MgNO_3$, can be added into the dispersion solution 120 so that the first carbon nanotubes 110 are well adhered to the second substrate (130 in FIG. 3C).

Figure 3C:
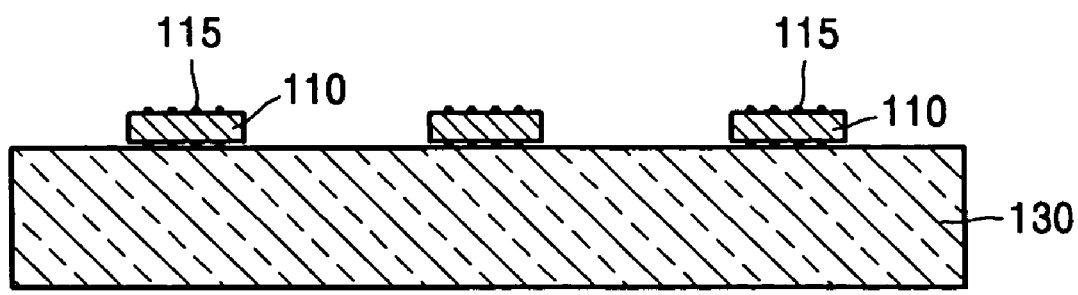

Referring to FIG. 3C, the second substrate 130 is coated with the dispersion solution 120 having the first carbon nanotubes 110 uniformly distributed therein, such that the first carbon nanotubes 110 are uniformly arranged on the second substrate 130 in parallel with the second substrate 130. Electrophoresis or spin coating can be used to coat the dispersion solution 120. The coated dispersion solution 120 is baked at a temperature of approximately 70 to 100° C., such that the first carbon nanotubes 110 are fixed to the second substrate 130 at a side thereof.

Figure 3D:
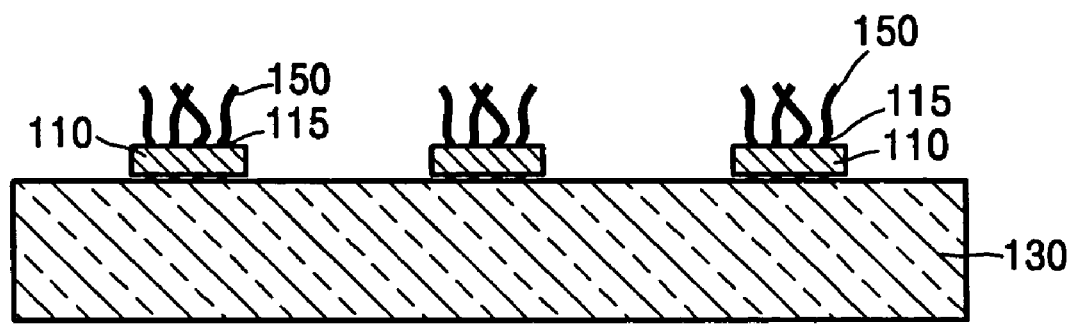

Referring to FIG. 3D, a plurality of second carbon nanotubes 150 each having a fine diameter are grown on a surface of each of the first carbon nanotubes 110, which are fixed on the second substrate 130, by the thermal CVD. In this process, the second carbon nanotubes 150 are grown in a random direction from the nano catalyst particles 115 on the surface of the first carbon nanotubes 110. The second carbon nanotubes 150 have a diameter of approximately 1 to 10 nm. FIGS. 5A through 5D are TEM images of the second carbon nanotubes that are grown from the surface of the first carbon nanotubes by the thermal CVD. Referring to FIGS. 5A through 5D, it can be seen that the second carbon nanotubes were grown from the nano catalyst particles on the surface of the first carbon nanotubes, which have been grown by the PECVD. Furthermore, it can be seen that the second carbon nanotubes have the same diameter as that of the nano catalyst particles on the surface of the first carbon nanotubes, and were grown in random directions.

A method of fabricating an FED by applying the method of fabricating the carbon nanotube emitter of the above-described embodiment is discussed below.

FIGS. 6A through 6F are views of a method of fabricating an FED according to an embodiment of the present invention.

Figure 6A:
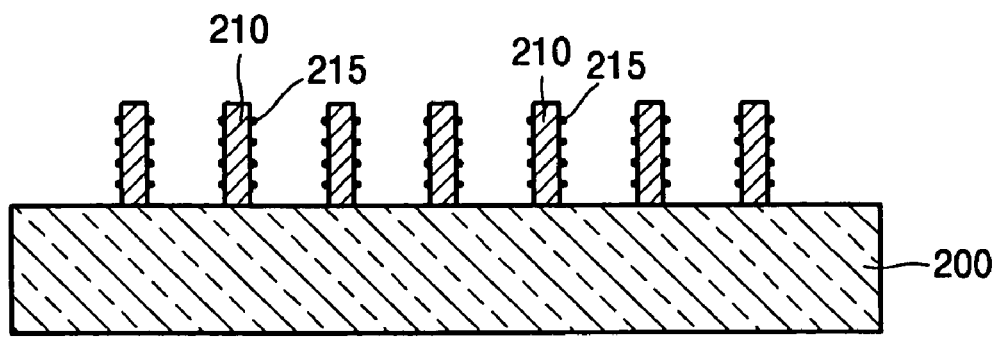
FIGS. 6A through 6F are views of a method of fabricating a Field Emission Device (FED) according to an embodiment of the present invention.

Referring to FIG. 6A, a plurality of first carbon nanotubes 210 are vertically grown on a first substrate 200 having a catalyst material layer formed thereon by PECVD. The first formed carbon nanotubes 210 have a diameter of approximately 30 to 100 nm. Nano catalyst particles 215 are present on a surface of the first grown carbon nanotubes 210, as previously stated, wherein the nano catalyst particles 215 are formed of a Ni or an Invar alloy having a size of approximately 1 to 10 nm, for example.

Figure 6B:
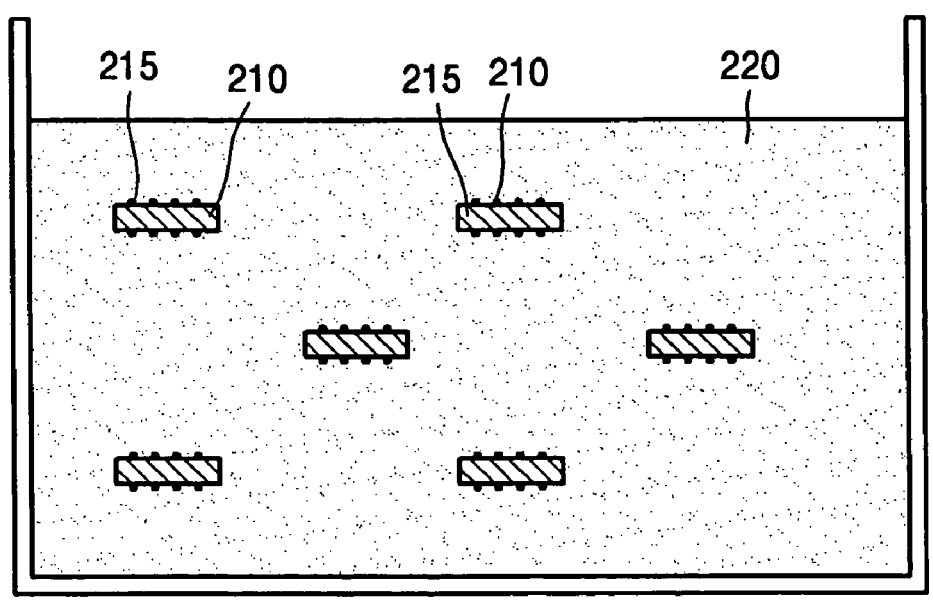

Referring to FIG. 6B, the first carbon nanotubes 210 are separated from the first substrate 200 by an ultrasonic wave, for example, and are immersed in a dispersion solution 220, such as IPA or DI water, to be uniformly dispersed.

Figure 6C:
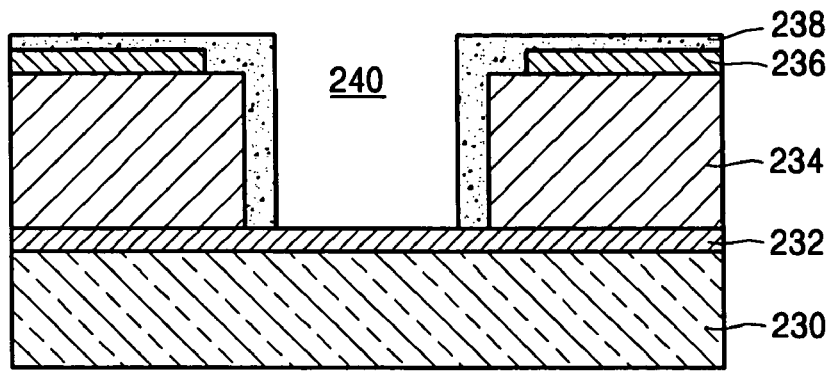

Referring to FIG. 6C, a cathode electrode 232, an insulating layer 234, and a gate electrode 236 are sequentially formed on a second substrate 230, and an emitter hole 240 is formed in the insulating layer 234 to expose part of the cathode electrode 232. A glass substrate can be used as the second substrate 230. The cathode electrode 232 can be formed of an Indium Tin Oxide (ITO) that is a conductive transparent material, and the gate electrode 236 can be formed of a conductive metal, for example, chromium (Cr). Specifically, the cathode electrode 232 is formed by depositing the cathode electrode layer of the ITO on the substrate 230 and patterning the deposited cathode electrode layer into a predetermined shape, for example, a stripe shape. The insulating layer 234 is then formed on entire surfaces of the cathode electrode 232 and the second substrate 230. Subsequently, a gate electrode layer is formed on the insulating layer 234. The gate electrode layer is formed by depositing a conductive metal by sputtering, for example. The gate electrode 236 is formed by patterning this gate electrode layer into a predetermined shape. The insulating layer 234, which is exposed via the gate electrode 236, is then etched to form the emitter hole 240 that exposes the part of the cathode electrode 232.

A photoresist 238 is then coated to cover a top surface of the gate electrode 236 and an inner wall of the emitter hole 240, and is then patterned to expose the cathode electrode 232 positioned beneath the emitter hole 240.

Figure 6D:
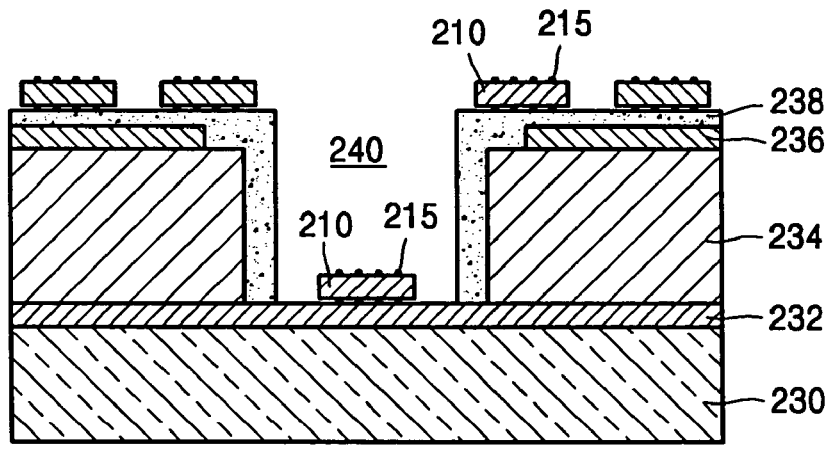

Referring to FIG. 6D, the dispersion solution 220 having the first carbon nanotubes 210 uniformly distributed therein is coated on the entire surface of the artifact as shown in FIG. 6D. Eectrophoresis or spin coating can be used to coat the dispersion solution 220. The coated dispersion solution 220 is then baked at a temperature of approximately 70 to 100° C., such that the first carbon nanotubes 210 is fixed to the photoresist 238 and the exposed cathode electrode 232 at a side thereof.

Figure 6E:
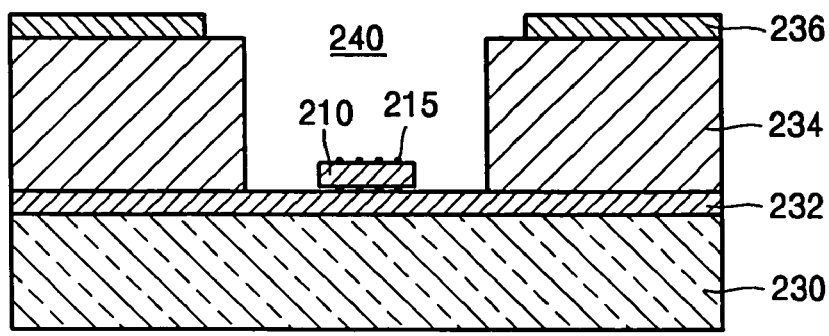

Referring to FIG. 6E, the photoresist 238 is removed by acetone, for example, such that only at least one first carbon nanotube 210 fixed to the exposed cathode electrode 232 is left.

Figure 6F:
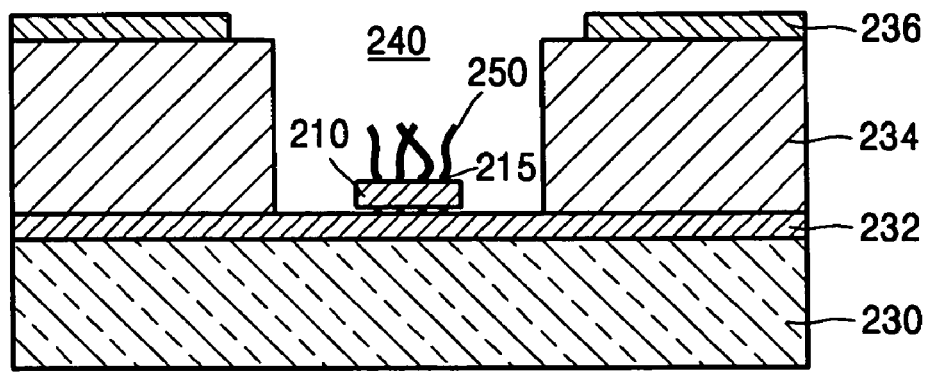

Referring to FIG. 6F, a plurality of second carbon nanotubes 250 having a fine diameter are grown on the surface of the first carbon nanotube 210, which is fixed to the cathode electrode 232, by the thermal CVD. In this process, the second carbon nanotubes 250 are grown in a random direction from the nano catalyst particles 215 on the surface of the first carbon nanotube 210. The second carbon nanotubes 250 have a diameter of approximately 1 to 10 nm.

Figure 7:
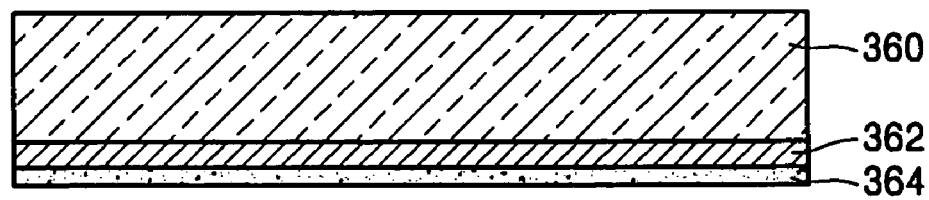
FIG. 7 is a schematic cross-sectional view of a display device including a carbon nanotube emitter according to an embodiment of the present invention.
Figure 7:
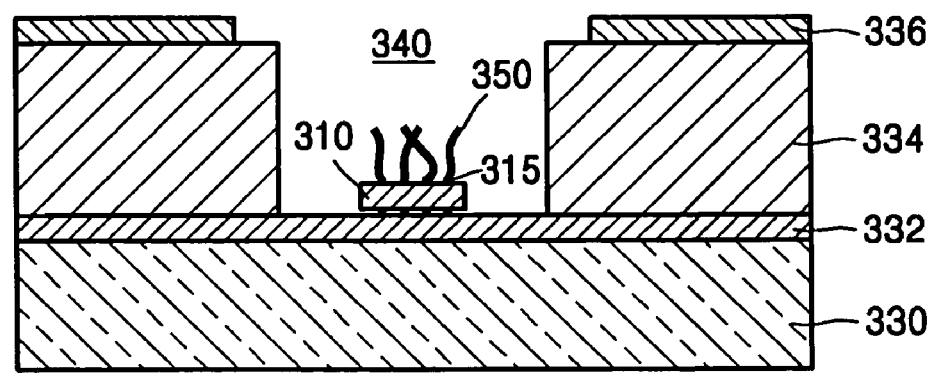

FIG. 7 is a schematic cross-sectional view of a display device using the above-stated FED.

Referring to FIG. 7, a lower substrate 330 and an upper substrate 360 are disposed to be spaced apart from each other. A cathode electrode 332 is formed on the lower substrate 330, and an insulating layer 334 having an emitter hole 340 that exposes part of the cathode electrode 332 is formed on the cathode electrode 332. A gate electrode 336 is formed on the insulating layer 334. A carbon nanotube emitter is formed on the cathode electrode 332, which is exposed via the emitter hole 340. In this case, the carbon nanotube emitter is composed of at least one first carbon nanotube 310 fixed to the cathode electrode 332 in parallel with the cathode electrode 332, and a plurality of the second carbon nanotubes 350 formed on a surface of the first carbon nanotube 310. In this case, a plurality of nano catalyst particles 315 are present on the surface of the first carbon nanotube 310, and the second carbon nanotubes 350 are grown and formed from the nano catalyst particles 315 by the thermal CVD. An anode electrode 362, which corresponds to the cathode electrode 332, is formed on a bottom surface of the upper substrate 360, and a phosphor layer 364 is formed on a bottom surface of the anode electrode 362.

As described above, the present invention has the following effects:

First, it is possible to obtain low electron emission voltage by forming a plurality of second carbon nanotubes having a nano size diameter on a surface of first carbon nanotubes.

Second, it is possible to obtain a uniform electron emission by uniformly distributing second carbon nanotubes on the surface of the first carbon nanotubes.

Third, it is possible to control emitter density by adjusting the concentration of first carbon nano tubes.

Fourth, the present invention is easy to apply to a large-sized device because of the use of a dispersion solution.

While the present invention has been particularly shown and described with reference to exemplary embodiments thereof, it will be understood by those of ordinary skill in the art that various modifications in form and detail can be made therein without departing from the spirit and scope of the present invention as defined by the following claims.

What is claimed is:

1. A method of fabricating a carbon nanotube emitter, the method comprising:
    growing a plurality of first carbon nanotubes on a first substrate having a catalyst material layer arranged thereon;
    separating the first carbon nanotubes from the first substrate and immersing the first separated carbon nanotubes in a dispersion solution;
    coating a second substrate with the dispersion solution and baking the second coated substrate at a predetermined temperature to fix the first carbon nanotubes on the second substrate and in parallel with the second substrate; and
    growing a plurality of second carbon nanotubes from a plurality of nano catalyst particles on the surface of the first carbon nanotubes.

2. The method of claim 1, wherein the catalyst material layer comprises either a nickel (Ni) or an Invar alloy.

3. The method of claim 1, wherein the first carbon nanotubes are vertically grown on the first substrate by Plasma Enhanced Chemical Vapor Deposition (PECVD).

4. The method of claim 1, wherein the first carbon nanotubes are separated from the first substrate by an ultrasonic wave.

5. The method of claim 1, wherein the dispersion solution is either IsoPropyl Alcohol (IPA) or Deionized (DI) water.

6. The method of claim 1, wherein the dispersion solution includes a charging agent.

7. The method of claim 1, wherein the dispersion solution is coated by either electrophoresis or spin coating 8. The method of claim 1, wherein the dispersion solution is baked at a temperature in a range of 70 to 100° C.

9. The method of claim 1, wherein the second carbon nanotubes are gown by thermal Chemical Vapor Deposition (CVD).

10. A method of fabricating a field emission device, comprising:
    growing a plurality of first carbon nanotubes on a first substrate having a catalyst material layer formed thereon;
    separating the first carbon nanotubes from the first substrate and immersing the first separated carbon nanotubes into a dispersion solution;
    sequentially forming a cathode electrode, an insulating layer, and a gate electrode on the second substrate and forming an emitter hole to expose a part of the cathode electrode;
    coating a top surface of the gate electrode and an inner wall of the emitter hole with photoresist to cover them and patterning the photoresist to expose the cathode electrode beneath the emitter hole;
    coating the photoresist and the exposed cathode electrode with the dispersion solution and baking them at a predetermined temperature;
    removing the photoresist to leave the first carbon nanotubes on the exposed cathode electrode; and
    growing a plurality of second carbon nanotubes from a plurality of nano catalyst particles on the surface of the first carbon nanotubes.

11. The method of claim 10, wherein the catalyst material layer is formed of either nickel (Ni) or an Invar alloy.

12. The method of claim 10, wherein the first carbon nanotubes are vertically grown on the first substrate by Plasma Enhanced Chemical Vapor Deposition (PEG VD).

13. The method of claim 10, wherein the first carbon nanotubes are separated from the first substrate by an ultrasonic wave.

14. The method of claim 10, wherein the dispersion solution is either IsoPropyl Alcohol (IPA) or Deionized (DI) water.

15. The method of claim 10, wherein the dispersion solution includes a charging agent.

16. The method of claim 10, wherein the dispersion solution is coated by either electrophoresis or spin coating.

17. The method of claim 10, wherein the dispersion solution is baked at a temperature in a range of 70 to 100° C.

18. The method of claim 10, wherein the photoresist is removed by acetone.

19. The method of claim 10, wherein the second carbon nanotubes are grown by thermal Chemical Vapor Deposition (CVD).

* * * * *